(No Model.)
J. McMAHON.
HARROW FRAME.
No. 413,538. Patented Oct. 22, 1889.
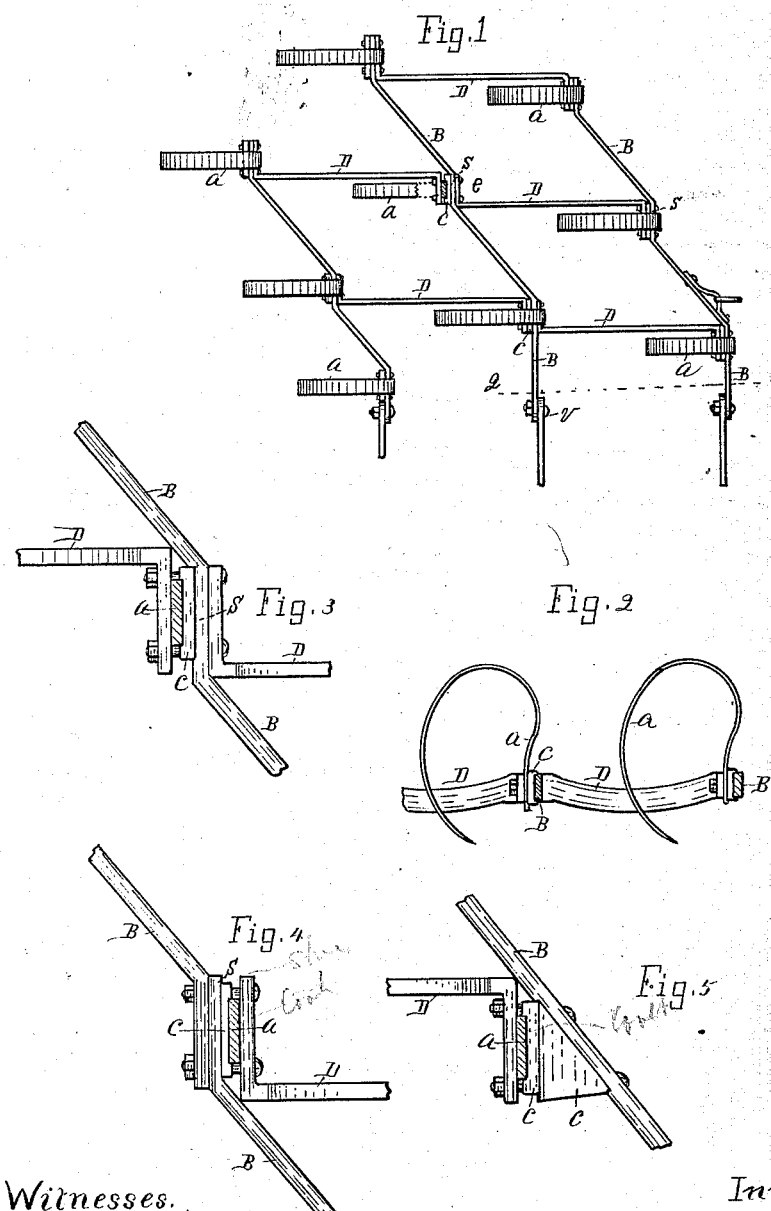
Witnesses.
John C. Perkins
S. N. Dursley
Inventor.
James McMahon
By Lucius C. West
Att'y.

UNITED STATES PATENT OFFICE.

JAMES McMAHON, OF KALAMAZOO, MICHIGAN, ASSIGNOR TO D. C. & H. C. REED & CO., OF SAME PLACE.

HARROW-FRAME.

SPECIFICATION forming part of Letters Patent No. 413,538, dated October 22, 1889.

Application filed December 17, 1888. Serial No. 293,859. (No model.)

*To all whom it may concern:*

Be it known that I, JAMES McMAHON, a subject of Queen Victoria, residing at Kalamazoo, county of Kalamazoo, State of Michigan, have invented a new and useful Harrow-Frame, of which the following is a specification.

This invention relates to harrows the frames of which are composed of thin metal bars, including both the draft-bars and cross-bars; and it has for its objects the peculiar construction of said bars and their relation to the frame and harrow teeth or shares, substantially as below described and claimed.

In the drawings forming a part of this specification, Figure 1 is a plan view; Fig. 2, a sectional elevation on the dotted line 2 2 in Fig. 1. Fig. 3 is an enlarged view of lettered parts in Fig. 1—as, for instance, at *e* in the latter-named figure, at which point the tooth is in section and broken; and Figs. 4 and 5 are like views, except they show changes below fully described.

Referring to the lettered parts of the drawings, B are the draft-bars, vertically edgewise, and having portions S at right-angles to the line of draft, against which portions the shank of the teeth *a* (or other suitable shares) are clamped. The ends of the series of cross-bars D are angled at the ends, which angled ends clamp the shanks of the teeth between them and the portion S of the draft-bars D by suitable bolts, as clearly shown in the drawings, especially in Fig. 3. While the shank of the tooth may be clamped between the part S, for convenience termed a "seat," yet to guard against the teeth tilting over I prefer to employ a block C, recessed vertically to receive the shank of the teeth, and recessed on the other side horizontally to receive the bars B. (See Figs. 2 and 3.) When the seat-blocks C are employed, the same bolts clamp all the parts together, as in Fig. 3, thus clamping the share and seat and attaching the angled ends of the cross-bars to the draft-bars.

Fig. 4 shows that the draft-bars may be lapped at the seat S, instead of being continuous and integral, as in Figs. 1 and 3. Fig. 5 shows that the draft-bars B may be straight throughout, and the seat be fixed at right angles to the line of draft by making the seat-block C beveled or thickest at one end.

By referring to Fig. 2 it will be seen that the cross-bars D of the frame are bowed downward vertically edgewise, so as to form in the frame a series of curved runners, the bows of which settle a little into the soil, thus preventing the frame from slewing from side to side, especially to one side on the side of a hill, causing the teeth to trail, and, what is also of great importance, the draft-bars B and the tooth-seats are all held above the surface of the soil, causing lighter draft and less wear to these elevated parts; but the teeth may be clamped between the seats S of the draft-bars and the angled ends of the cross-bars D when the frame is made without the downward bow of the cross-bars.

Fig. 1 shows above the hinges *v* one half of a float harrow-frame made in the usual butterfly form. It should be observed that the draft-bars may be made of wood, if preferred, with the straight parts S formed in it; or the blocks C in Fig. 5 may be used.

Having thus described my invention, what I claim, and desire to secure by Letters Patent of the United States, is—

1. A harrow consisting of a series of draft-bars bearing teeth or shares and a series of cross-bars attached at the ends to said draft-bars and bowed downward, forming runners to support the draft-bars and constituting part of the frame to hold the draft-bars, substantially as set forth.

2. A harrow-frame comprising the draft-bars having share-seats and a series of cross-bars bowed downward between their attachment with the draft-bars, forming runners, substantially as set forth.

3. The combination of the draft-bars having the portions forming share-seats, the cross-bars having the angled clamping ends, said cross-bars being bowed downward between the draft-bars, teeth or shares, and bolts clamping the teeth or shares, the draft-bars, and the angled ends of the cross-bars together, substantially as set forth.

4. The combination of draft-bars, the downwardly-bowed cross-bars having the angled clamping ends, the seat-blocks, the shares, and bolts clamping the draft-bars, the ends of the cross-bars, the shares, and seat-blocks together, substantially as set forth.

5. A metal harrow-frame comprising the oblique vertically-edgewise draft-bars having the seat portions, the vertically-edgewise cross-bars bowed downward between the draft-bars and having the angled clamping ends, and the clamping-bolts, substantially as set forth.

In testimony of the foregoing I have hereunto subscribed my name in presence of two witnesses.

JAMES McMAHON.

Witnesses:
HEBER C. REID,
WILL. M. SHEAR.